United States Patent [19]
Hochberg

[11] 3,895,082
[45] July 15, 1975

[54] POLYMER COMPOSITION

[75] Inventor: Seymore Hochberg, Wynnewood, Pa.

[73] Assignee: E. I. duPont de Nemours & Co., Wilmington, Del.

[22] Filed: Sept. 6, 1973

[21] Appl. No.: 394,826

Related U.S. Application Data

[60] Continuation of Ser. No. 147,632, May 27, 1971, which is a division of Ser. No. 883,279, Dec. 8, 1969, which is a continuation-in-part of Ser. No. 671,594, Sept. 29, 1967, abandoned.

[52] U.S. Cl. .......... 260/885; 204/159.16; 260/875; 260/881; 260/886

[51] Int. Cl. .. C08f 15/16; C08f 15/36; C08f 15/38; C08f 19/10

[58] Field of Search .................... 260/885

[56] References Cited

UNITED STATES PATENTS

| | | | |
|---|---|---|---|
| 3,041,309 | 6/1962 | Baer | 260/885 |
| 3,055,859 | 9/1962 | Vollmert | 260/885 |
| 3,450,796 | 6/1969 | Griffin | 260/885 |
| 3,562,235 | 2/1971 | Ryan | 260/885 |
| 3,655,825 | 4/1972 | Souder et al. | 260/876 R |
| 3,678,133 | 7/1972 | Ryan | 260/876 R |
| 3,787,522 | 1/1974 | Dickie et al. | 260/836 |
| 3,808,180 | 4/1974 | Owens | 260/885 |

*Primary Examiner*—Murray Tillman
*Assistant Examiner*—Thurman Kennis Page
*Attorney, Agent, or Firm*—John E. Griffiths

[57] ABSTRACT

Polymer compositions having beneficial utility in the manufacture of adherent, flexible, polymeric coatings and adhesive layers and having wide utility in the polymeric film-forming art are prepared by first providing spherical mono-molecular particles of a rubbery polymer which has a weight average molecular weight of at least 100 million which particles have means for attaching thereto by a chemical bond a second polymeric portion, and then attaching to said particles by a chemical bond (e.g. by grafting) a second portion composed of a polymer which is soluble in a hard polymer selected from polymers having a weight average molecular weight of about 50,000 to 10 million and a Knoop hardness value of at least 5; very useful film-forming compositions are obtainable by dispersing the resulting polymeric particles and said hard polymer in a liquid such as water or an organic solvent suitable for use as the continuous phase of a polymer solution or suspension.

4 Claims, No Drawings

POLYMER COMPOSITION

CROSS-REFERENCE TO RELATED APPLICATIONS

This application is a continuation of my application Ser. No. 147,632, filed May 27, 1971, which is a divisional of my application Ser. No. 883,279, filed Dec. 8, 1969 as a continuation-in-part of my application Ser. No. 671,594, filed Sept. 29, 1967, and now abandoned.

BACKGROUND OF THE INVENTION

The present invention relates to polymeric compositions comprised of spherical particles of a high molecular weight rubbery polymer, to a process for preparing said compositions, to film-forming compositions containing them, and to articles coated with the compositions.

The industries which manufacture polymeric adhesives, coating compositions, films and polymer-coated articles are in need of a substance which can be added to, and easily blended with, a solution of a hard polymer such as cellulose acetate butyrate, poly(methyl methacrylate), poly(vinyl chloride) or the like to provide satisfactory adhesion and/or flexibility or other desirable properties in the resulting film, laminate or coated article without causing the harmful change in other properties (e.g., undue reduction in polymer softening point) that is often encountered when adding conventional plasticizers to such polymeric compositions.

There is also a need for liquid film-forming compositions containing a plurality of polymer components which will not undergo premature or harmful separation or flocculation.

SUMMARY OF THE INVENTION

The present invention provides a liquid filmforming composition comprising

A. a liquid adapted for use as a continuous phase of a polymer solution or suspension, B. dispersed in (A), a hard polymer having a weight average molecular weight of about 50,000 to 10 million and a Knoop hardness value at least 5, and C. dispersed in (A), polymeric particles which (1) are soluble in (B), (2) are free of any covalent chemical bond to (B), and (3) are comprised of substantially spherical monomolecular particles of a polymer which has a weight average molecular weight of at least 100 million and is rubbery at a temperature below 60°C.

The invention also provides an article comprising a substrate having in adherence therewith a solidified layer of the composition defined in the previous paragraph.

Also provided by the present invention is a polymeric composition comprised of composite polymeric particles having a second portion attached by a chemical bond to a first portion, said second portion being a polymer which is soluble in a hard polymer as defined in (B) above, and said first portion being a substantially spherical monomolecular particle of a polymer which has a weight average molecular weight of at least 100 million, is rubbery at a temperature below 60°C., and in the absence of said second portion is insoluble in said hard polymer, and having the ability when dispersed in a liquid as defined in (A) above to remain in a condition within the range of non-swollen to swollen up to about 10 times its original volume.

Furthermore, the invention provides a process for preparing a polymeric composition which comprises I. providing as a first portion substantially spherical monomolecular particles of a polymer which has a weight average molecular weight of at least 100 million, and is rubbery at a temperature below 60°C., each of said particles having means for attaching thereto by a chemical bond a second polymeric portion, and II. attaching to each of said particles by a chemical bond a second portion composed of a polymer which is soluble in a hard polymer as defined in (B) above.

With reference to the novel film-forming composition, polymer component (B) has a Knoop hardness value of at least 5; this value can be determined by using ASTM test method D-1474.

The polymeric particles of component (C) are considered soluble in the hard polymer component (B) when the mixture of components (B) and (C) in liquid (A) is such that component (C) is thermodynamically stable against spontaneous flocculation or aggregation. The word spontaneous as used here means without work done by an external source.

The spherical particles of high molecular weight polymer are rubbery at a temperature below 60°C. They are above their glass transition temperature under normal use conditions. In many cases the rubbery polymer will have at least 50% elongation at break.

DESCRIPTION OF PREFERRED EMBODIMENTS

In the liquid film-forming composition, the polymeric particles of component (C) are preferably composite particles having a second portion attached by a chemical bond to a first portion, said second portion being a polymer which is soluble in (B), and said first portion being said spherical particles of rubbery polymer; said spherical paticles being in a condition within the range of non-swollen to swollen up to about 6 times their original volume, and in the absence of said second portion being insoluble in (B). Also, it is usually preferred that the weight ratio of said first portion to said second portion be about 65:35 to 88:12. One skilled in the art will be able to use known methods of gel permeation chromatography to determine the weight ratio of the first and second portions of the composite particles, and to determine the amount of ungrafted polymer and its molecular weight. The polymer of the second portion is preferably chemically different from that of the first portion; for example, it is made from one or more different monomers, or from different proportions of the same monomers.

In one useful form of the liquid composition, all or most of component (A) is water, and components (B) and (C) are in the form of fine particles in a stable state of dispersion in component (A). In another useful form of the liquid composition, all or most of component (A) in an organic liquid which is a solvent for component (B) but not necessarily for component (C), and component (B) is in solution in component (A).

When using the preferred composite particles, it is often preferred that the second portion of component (C) be a non-rubbery polymer having a weight average molecular weight of about 1,000–150,000, preferably about 80,000–150,000; and preferably a polymer which is below its glass transition temperature under normal use conditions. It is also preferred that the first portion of the composite particles consist essentially of particles of cross-linked polymeric material whose average diameter is about 60–20,000 millimicrons. A diameter of about 60–500 millimicrons is especially preferred when the object is to form a coating or film of high gloss. For medium gloss, a diameter of about 500–2,000 is usually preferred.

As component (B), I prefer to use a non-crosslinked polymer (linear or branched polymer) which, when in its pure solid form, is in a glassy state at a temperature above 60°C.; for example, a polymer having less than 4% elongation at break, and one that will undergo cracking on brief exposure to a liquid solvent capable of dissolving or greatly swelling the polymer. In some cases I prefer to use cellulose acetate butyrate; in other cases I prefer to use a poly(alkyl methacrylate) having 1–8 carbon atoms in the alkyl radical, or a blend of such a polymer with a minor proportion (up to about 49% by weight) of another polymer which is below its glass transition temperature under normal use conditions.

In one very useful embodiment of the invention, the first portion of (C) is composed predominantly of a poly(alkyl acrylate), and the second portion of (C) is composed predominantly of a poly(alkyl methacrylate) grafted onto said first portion at sites which had originally been pendent sites of free radical attack; the alkyl radical of said first and second portions having 1–8 carbon atoms. For example, one can use composite particles wherein said first portion is predominantly poly(-butyl acrylate), and said second portion is predominantly poly(methyl methacrylate).

Another embodiment of the invention employs composite particles wherein the first and second portions of (C) are attached to each other by means of a polar group present in each of said portions. For example, one can use particles wherein one of said portions contains a carboxylic acid group, and the other portion contains a tertiary amine group.

Additives known to be useful in the preparation of liquid film-forming compositions can be added to the liquid compositions of this invention, for example, pigments, plasticizers, stabilizers, tackifiers, flow-controllers and flatting agents. Film-forming compositions are obtainable in accordance with the invention having a high level of stability and a very high polymer solids content. The liquid compositions can be applied to substrates by brushing, spraying, roller-coating, doctor-knifing and other known coating methods.

The liquid film-forming composition can be applied to any suitable substrate and solidified by evaporation of the liquid (A) component or by other solidification methods known in the art of forming polymer coatings and films. Among the more useful substrates are metal, wood, leather, man-made leather-like sheet materials, paper, fabrics, polymer-coated fabrics, and polymeric sheet materials. When it is desired to prepare an unsupported film of the composite polymeric composition, it is of course advisable to use a substrate material which is easily removable from the dried layer of composition.

With reference to the previously described novel polymeric composition comprised of the composite particles, I prefer to use for the second portion of the particles a non-rubbery polymer, which for the sake of convenience can be referred to as polymer $N_1$, and to prepare the composite particles so as to be soluble in another non-rubbery polymer (referred to for the sake of convenience as polymer $N_2$), the latter being free of any chemical bond to the composite particles when present in a liquid film-forming composition comprised of a dispersion in a liquid (as defined in component (A) above) of said particles and said $N_2$ polymer.

Dried compositions of the composite particles of the present invention are useful in the manufacture of liquid film-forming compositions, including compositions to be used in the manufacture of adhesives, lacquers, paints, polymeric films, laminates and coated articles. When the dried particles are mixed with a volatile organic solvent which dissolves the grafted-on polymer, in accordance with preferred embodiments of the invention, a stable polymer dispersion is easily obtained. Also, by dissolving a suitable amount of a polymer having greater hardness than the polymer of the rubber first portion in the organic solvent of the composition, it is possible to obtain a film-forming composition useful in forming coatings having excellent flexibility, adhesion and other desirable properties, the rubbery first portion of the particles in the product functioning somewhat as a plasticizer (e.g., by improving flexibility and adhesion) without causing the undue reduction in polymer softening point and other harmful side effects which are often encountered when using conventional plasticizers. In a preferred manner of carrying out the previously described process of this invention, the attaching step (II) comprises forming enough poly(alkyl methacrylate) in a suitable reaction medium in the presence of the particles obtained in step (I) so that the weight ratio of the spherical particles to grafted on poly(alkyl methacrylate) is about 65:35 to 88:12. Especially preferred is a process wherein the particles provided in step (I) are prepared by polymerizing in a suitable reaction medium a mixture of reactive components which contains in each 100 parts of weight thereof (x) about 75–99 parts of a monoethylenically unsaturated monomer having an alkyl ($C_1$–$C_8$) acrylate content of about 75–100% by weight, (y) up to about 24 parts of allyl methacrylate, and (Z) about 1–15 parts of a cross-linking agent having at least two easily polymerizable ethylenic double bonds per molecule.

An example of a suitable reaction medium is water containing a suitable initiator and emulsifier.

The use of allyl methacrylate as a reactive component is one very useful means of obtaining the pendant sites of free radical attack. In addition to the alkyl acrylate, component (x) of the reaction mixture can also contain a minor proportion (e.g., up to about 25% by weight) of any other suitable known monoethylenically unsaturated monomer, for example, styrene, acrylonitrile, methacrylonitrile, methacrylic acid and the like. The alkyl acrylates generally preferred are ethyl acrylate, butyl acrylate and 2-ethyl-hexyl acrylate, and blends thereof. Pendant sites of free radical attack can be provided by the use of 2-ethyl-hexyl acrylate as all or part of the alkyl acrylate component.

It is also possible to provide pendant sites of free radical attack by exposing the alkyl acrylate polymer particles to a suitable source of radiant energy, for example, the ionizing radiation from high voltage electrons or ultraviolet light.

A preferred cross-linking agent for use in the mixture of reactive components is ethylene glycol dimethylacrylate; also useful are tetramethylene glycol diacrylate, trimethylol propane triacrylate, tetraethylene glycol dimethacrylate, methylene bisacrylamide, methylene bismethacrylamide, divinyl benzene, vinyl methacrylate, vinyl crotonate, vinyl acrylate, vinyl acetylene, trivinyl benzene, glycerine trimethacrylate, pentaerythritol tetramethacrylate, triallyl cyanurate, divinyl acetylene, divinyl ethane, divinyl sulfide, divinyl sulfone, hexatriene, triethylene glycol dimethacrylate, diallyl cyanamide, glycol diacrylate, ethylene glycol divinyl ether, diallyl phthalate, divinyl dimethyl silane, glycerol trivinyl ether and the like. The cross-linking agent itself can be a source of the required pendant sites of free radical attack.

Step (I) of the novel process is preferably carried out by agitating an aqueous emulsion of the reactive components mentioned above, to which has been added a polymerization initiator, at a temperature which enables the reaction to take place until the reaction is substantially complete. One skilled in the art of emulsion polymerization will have no difficulty in selecting a suitable polymerization initiator, emulsifier and reaction temperature. Useful initiators are illustrated by potassium persulfate, sodium persulfate, ammonium persulfate, tertiary butyl hydroperoxide, hydrogen peroxide, azo bis(isobutyronitrile), azo bis(isobutyroimidine hydrochloride), various redox (reduction-oxidation) systems such as hydrogen peroxide and ferrous sulfate, and well known persulfate-bisulfite combinations. Usually about 0.05–5.0% by weight of the initiator is used based on the weight of reactive components.

It will be obvious to a skilled polymer chemist that other polymerization methods (e.g., bulk, solution and organosol methods) can be employed in carrying out step (I) of the process. If the particular method used does not result in particles that are as small as desired, the particle size can be reduced to the desired level by any suitable known grinding method.

Step (II) of the novel process is preferably carried out by agitating an aqueous emulsion of a mixture of the spherical particle product of step (I), a suitable amount of an alkyl ($C_1$–$C_8$) methacrylate monomer, and a polymerization catalyst, at a temperature which permits the formation of the poly(alkyl methacrylate), until the polymerization/grafting reaction is substantially complete.

A clean, dry powder of the composite particle composition useful for the preparation of coatings, films, adhesives and the like can be prepared by employing known separation methods (e.g., coagulating filtering, washing and drying) to separate the particles with grafted-on polymer from the aqueous phase or other reaction medium and any harmful contaminants which might be present. The resulting powder can be mixed with an organic liquid which is a solvent for the grafted-on polymer to form a liquid composition having beneficial utility in the preparation of coatings, films, adhesives and the like.

The means for attaching the second portion is such that all or part of the attached portion will stay attached to the first portion of the composite particles for an extended period of time after the novel film-forming composition has been prepared.

Liquid film-forming compositions are obtainable according to the present invention which have a surprising degree of stability. For example, a composition of relatively low viscosity can be prepared which will not separate into different layers when stored for a period of time sufficient to cause related prior art compositions to undergo harmful separation.

The examples which follow are given for the purpose of illustrating the invention. All quantities shown are on a weight basis unless otherwise indicated.

EXAMPLE 1

A polymeric composition in the form of a clean, dry powder having excellent utility in the manufacture of liquid film-forming compositions is prepared by (1) forming an aqueous emulsion of the reactive components [92.5 parts butyl acrylate, 2.5 parts allyl methacrylate and 5 parts EGD (ethylene glycol dimethacrylate)] in 200 parts of water to which has been added 0.5 part, dry basis, of a 30% aqueous solution of sodium lauryl sulfate (emulsifier) and 0.06 part, dry basis, of a 5% aqueous solution of potassium persulfate (initiator), the emulsion being formed in a polymerization vessel under nitrogen by adding the emulsifier to the water, heating the mixture to 100°C., cooling the mixture to 70°C., and adding the reactive components (monomers) and the initiator; (2) agitating the resulting aqueous emulsion at a temperature of 70°C. until the polymerization reaction has been completed, thereby providing a latex of poly(butyl acrylate) spherical particles having a solids content of about 33% and the particles having pendant sites of free radical attack (hydrogen atoms easily abstracted by free radicals); (3) mixing with the resulting latex enough water to reduce the solids content to about 25%, and then adding enough methyl methacrylate so that the weight ratio of methyl methacrylate to polybutyl acrylate (PBA) particle solids in the mixture is about 33/67, plus 1.0 part, wet basis, of a 70% aqueous paste of benzoyl peroxide and 0.5 part thiophenol (on the basis of 100 parts methyl methacrylate); (4) agitating the resulting aqueous emulsion at a temperature of 65°C. for 6 hours to cause a polymerization/grafting reaction wherein poly(methyl methacrylate) is grafted onto the PBA particles at the sites which had been pendant sites of free radical attack; and (5) preparing a clean, dry powder of the resulting composite grafted-polymer-modified PBA particles by mixing 50 parts of acetone with 50 parts of the latex resulting from step (4) to precipitate the composite particles, and then collecting the particles of a No. 1 Whatman filter paper in a Buchner funnel, washing the particles with water until substantially free of water-soluble impurities and drying them in an oven heated to 55°C.

The resulting dried polymeric composition is very useful for the preparation of liquid film-forming compositions to be used in the manufacture of adhesives, polymeric films and coated articles.

The spherical PBA particles of the latex provided in step (2) have a weight average molecular weight of about 3 billion, and they are rubbery at temperatures down to about −20°C. They are monomolecular particles of crosslinked polymer whose average diameter is about 200 millimicrons. The composite particles obtained in step (5) contain grafted on PMM (polymethyl methacrylate) whose molecular weight is about 100,000. The PMM is attached to the PBA by covalent bonds. The PBA:PMM weight ratio in the particles is about 70:30.

The dried composite particles produced in Example 1 can be used in place of a portion (e.g., about 15–60%) of the poly(methyl methacrylate) in a conventional pigmented acrylic lacquer for coating flexible sheets of aluminum, steel and the like to improve the adhesion, flexibility and toughness characteristics of the coating. Useful articles can be made from the coated sheets by cutting or bending them to the desired shape without damaging the coating.

EXAMPLE 2

A liquid polymeric film-forming composition which is very useful as a coating composition for leather, man-made leather-like sheet materials and other substrates is prepared by (a) mixing 15 parts of the dried composite particles prepared according to the procedure described in Example 1 with 85 parts of a solvent consisting of a 50/50 blend of methyl ethyl ketone and toluene, the PBA:PMM particles being easily dispersed in the solvent and forming a dispersion having good stability; (b) mixing 3.25 parts of a 60/40 blend of plasticizers (dibutoxyethyl phthalate) and cellulose acetate butyrate with 96.75 parts of a volatile organic solvent consisting of a 10/49/41 blend of acetone, methyl isobutyl ketone and n-butyl acetate, the cellulose acetate butyrate having a butyryl content of 17% and a falling ball viscosity of 2 seconds when diluted according to ASTM method D-1343-54T; (c) mixing the compositions resulting from steps (1) and (2) in such proportions that the resulting mixture contains 50 parts of the composite particles, 30 parts plasticizer and 20 parts cellulose acetate butyrate in each 100 parts of nonvolatile components; and (d) mixing with the composition resulting from step (c), enough of a 50/50 blend of acetone and toluene so that the resulting mixture contains 3.25% of nonvolatile components.

The liquid composition prepared in Example 2 can be applied as a clear top coat on leather and man-made leather-like products to provide products having excellent top coat flexibility and adhesion while having little or no tendency to show a noticeable whitening effect in areas where the products are creased. To illustrate, the composition resulting from Example 2 can be used in place of the clear pyroxylin lacquer when preparing a man-made leather-like sheet material according to the procedure described in Example 5 of U.S. Pat. No. 3,261,796 issued July 19, 1966 to J. A. Simms.

The CAB (cellulose acetate butyrate) used in step (b) of Example 2 has a Knoop hardness value of greater than 5. It is in a glassy state at temperatures up to about 100°C. The composite PBA:PMM particles in the composition are soluble in the CAB within the meaning described above, and they are free of any covalent chemical bond to the CAB. The PBA portion of the particles in the composition are swollen to about 5 times their original volume (prior to step a). The CAB is a non-crosslinked polymer, and it is in solution in the liquid solvent mixture. If the PMM portion of the particles were absent, the PBA particles would be insoluble in the CAB.

The composition is very stable. The CAB and the composite particles remain free of flocculation and aggregation when the composition is allowed to stand for 30 days or longer at 25°C.

When Example 2 is repeated (including the preparation of the leather-like sheet material) except the composite particles are replaced with an equal amount of cellulose acetate butyrate, the top coat flexibility and adhesion are not as good, and it has a very definite tendency to show an objectionable whitening effect in areas where the products are creased.

EXAMPLE 3

A clear coating composition useful for coating various substrates is prepared by (a) making composite particles in the manner described in Example 1 except the reactive components of step 1 are 80 parts butyl acrylate, 5 parts allyl methacrylate and 15 parts trimethylol propane acrylate, and in step 3 the ratio of methyl methacrylate to PBA is about 50:50, (b) making a mixture in the manner described in Example 2 except the composite particles just prepared are used in step a, the CAB of step b is replaced with PMM, the plasticizer is n-butyl propylene glycol phthalate, and the resulting composition contains the PBA, PMM and plasticizer in a weight ratio of 27:53:20.

When the composition is poured through a filter whose pore size is 0.5 to 5 microns, there is no deposit on the filter. The composition remains free of flocculation for at least one year. A dried 2 mil thick coating of the composition on a glass substrate has a clear glossy appearance.

EXAMPLE 3A

For purposes of comparison, a composition outside the present invention is prepared by repeating Example 3 except the particles of step a are replaced with the Example 3 PBA particles having no grafted on polymer. The composition has the same PBA:PMM:plasticizer weight ration as that of Example 3. The PBA particles are not soluble in the PMM resin added to the composition. The composition flocculates in less than 5 seconds to a gelled mass that is not useful as a liquid coating composition.

EXAMPLE 4

A white lacquer type of coating composition is prepared by (1) making composite particles in the manner described in Example 1, (2) making a mixture in the manner described in Example 2 except the CAB of step b is replaced with PMM whose molecular weight is about 59,000, the plasticizer is that of Example 3, and the resulting composition contains the PBA, PMM and plasticizer in a weight ratio of 15:55:30, and (3) mixing 100 parts of the resulting composition with 40 parts dry basis of a titanium dioxide dispersion made by dispersing 400 parts titanium dioxide in a solution of 100 parts of a 99:1 copolymer of methyl methacrylate and methacrylic acid.

The composition remains free of flocculation for at least one year. A dried 2 mil thick coating of the composition on rust inhibitor ("Bonderite"100) treated steel has good resistance to damage by bumping and bending the coating article.

EXAMPLE 4A

Example 4 is repeated except in step (1) the amount of butyl acrylate is 96.5 parts, the EGD is replaced with 1 part 1,3,-butane diol diacrylate, and the amount of emulsifier is 6 parts. The PBA particles are 60 millimicrons in diameter. The dried coating is more flexible.

Another coating composition of the present invention can be prepared by preparing component C type polymer particles containing an acid group, for example particles of an ethyl acrylate/methacrylic acid copolymer, and mixing the particles with a solution of a component B type polymer containing an amine group, for example a copolymer of methyl methacrylate and DEAM (diethyl amino ethyl methacrylate). There is no covalent bond between the particles and the dissolved polymer.

Another useful coating composition can be prepared from component C type composite particles wherein the first and second portions are attached to each other by means of a polar group present in each; for example the first portion can be made from a 94:1:5 mixture of ethyl acrylate, 1,3 butane dioldiacrylate and methacrylic acid. And the second portion can be a 95:5 copolymer of methyl methacrylate and DEAM.

Another type of composite particle within the present invention can be prepared wherein the first portion is made of neoprene and the grafted on second portion is polymethyl methacrylate.

A coating composition of this invention in the form of a latex house paint can be prepared by first making an aqueous dispersion of component C type composite particles wherein the first portion is made of 96.5 parts 2-ethyl hexyl acrylate, 2.5 parts allyl methacrylate, and 1 part 1,3-butane diol diacrylate and the grafted on portion is a 57:40:3 copolymer of methyl methacrylate, 2-ethyl hexyl acrylate and methacrylic acid, the ratio of the first and second portions being 67:33. And then replacing a portion of the polymer of a typical latex house paint with the resulting composite particles. For example, about 20% of the amino ester polymer latex of Example 4 of U.S. Pat. No. 3,261,796 (issued to Simms on July 19, 1966) can be replaced with a latex of the composite particles.

I claim:

1. A polymeric composition consisting essentially of a composite of polymeric particles having a second portion grafted to a first portion, said first portion formed by the steps of:

A. providing substantially spherical monomolecular particles, having an average diameter of about 60–20,000 millimicrons, a weight average molecular weight of at least 100 million, and which are rubbery at a temperature below 60°C, prepared by polymerizing, in a suitable reaction medium, a mixture of reactive compounds which contains, in each 100 parts of weight thereof x. about 75–99 parts of a monomer system selected from the group consisting of $C_1$ to $C_8$ alkyl acrylate and a mixture consisting of a $C_1$ to $C_8$ alkyl acrylate with up to 25% by weight of said mixture of one or more monoethylenically unsaturated monomers selected from the group consisting of styrene, acrylonitrile, methacrylonitrile, and methacrylic acid;

y. up to about 24 parts of allyl methacrylate;

z. about 1–15 parts of a cross-linking agent, other than allyl methacrylate, having at least two polymerizable ethylenic double bonds per molecule, selected from the groups consisting of ethylene glycol dimethacrylate, tetramethylene glycol diacrylate, trimethylol propane triacrylate, tetraethylene glycol dimethacrylate, methylene bisacrylamide, methylene bismethacrylamide, divinyl benzene, vinyl methacrylate, vinyl crotonate, vinyl acrylate, vinyl acetylene, trivinyl benzene, glycerine trimethacrylate, pentaerythritol tetramethyacrylate, triallyl cyanurate, divinyl acetylene, divinyl ethane, divinyl sulfide, divinyl sulfone, triethylene glycol dimethacrylate, diallyl cyanamide, glycol diacrylate, ethylene glycol divinyl ether, diallyl phthalate, divinyl dimethyl silane, and glycerol trivinyl ether; and B. grafting to the reaction sites in (A) a second portion composed of a polyalkyl methacrylate of 1-8 carbon atoms in the alkyl group having an average molecular weight of about 1,000 to 150,000, wherein the ratio of said first portion to said second portion is 65:35 to 88:12.

2. A process for preparing a polymeric composition which comprises

A. providing substantially spherical monomolecular particles, having an average diameter of about 60–20,000 millimicrons, a weight average molecular weight of at least 100 million, and which are rubbery at a temperature below 60°C, prepared by polymerizing, in a suitable reaction medium, a mixture of reactive compounds which contains, in each 100 parts of weight thereof x. about 75–99 parts of a monoethylenically unsaturated monomer having an alkyl ($C_1$–$C_8$) acrylate content of about 75–100% by weight;

y. up to about 24 parts of allyl methacrylate, and z. about 1–15 parts of a crosslinking agent, other than allyl methacrylate, having at least two polymerizable double bonds per molecule, and B. grafting to the reactive sites in (A) a second portion composed of a polyalkyl methacrylate of 1–8 carbon atoms in the alkyl group having an average molecular weight of about 1,000 to 150,000.

3. The composition of claim 1 wherein the alkyl acrylate in (A) (x) is butyl acrylate and the polyalkyl methacrylate of (B) is polymethyl methacrylate.

4. The process of claim 2 wherein the monomer in (A) (x) is butyl acrylate and the polyalkyl methacrylate in (B) is polymethyl methacrylate.

* * * * *